(12) United States Patent
Kikuchi et al.

(10) Patent No.: US 6,663,238 B2
(45) Date of Patent: Dec. 16, 2003

(54) LAMINATION APPARATUS AND RECORDING APPARATUS

(75) Inventors: Tetsuo Kikuchi, Kanagawa (JP); Eiichi Adachi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/934,707

(22) Filed: Aug. 23, 2001

(65) Prior Publication Data

US 2002/0027586 A1 Mar. 7, 2002

(30) Foreign Application Priority Data

Aug. 25, 2000 (JP) ........................................ 2000-255370
Oct. 20, 2000 (JP) ........................................ 2000-320453

(51) Int. Cl.$^7$ ............................ B41J 2/01; B32B 31/00; B32B 31/20; L09J 5/00; G01D 9/00
(52) U.S. Cl. ............................ 347/102; 347/104; 347/2; 347/105; 156/277; 156/308.2; 156/311; 156/498; 346/135.1; 399/342
(58) Field of Search ............................ 347/2, 102, 105, 347/104; 156/277, 308.2, 309.6, 311, 498; 346/135.1; 399/342

(56) References Cited

U.S. PATENT DOCUMENTS

| | | | | |
|---|---|---|---|---|
| 3,879,251 A | * | 4/1975 | Ingham ........................ 473/576 |
| 3,951,713 A | * | 4/1976 | Emmel ........................ 156/179 |
| 4,115,181 A | * | 9/1978 | Fujii et al. ................... 156/497 |
| 4,466,847 A | * | 8/1984 | Held ............................ 156/166 |
| 5,071,504 A | * | 12/1991 | Singer ......................... 100/314 |
| 5,210,581 A | * | 5/1993 | Kuzuya ....................... 156/277 |
| 5,217,561 A | * | 6/1993 | Ueda et al. .................. 156/359 |
| 5,238,517 A | * | 8/1993 | Heyes ......................... 118/400 |
| 5,306,381 A | * | 4/1994 | Nakazawa et al. .......... 156/497 |
| 5,318,648 A | * | 6/1994 | Heyes et al. ............ 156/244.24 |
| 5,368,677 A | * | 11/1994 | Ueda et al. .................. 156/362 |
| 5,534,105 A | * | 7/1996 | Boyd .......................... 156/277 |
| 5,897,726 A | * | 4/1999 | Shinkai et al. .............. 118/106 |
| 6,078,344 A | * | 6/2000 | Wen et al. ................... 347/212 |

* cited by examiner

Primary Examiner—Stephen D. Meier
Assistant Examiner—Leonard Liang
(74) Attorney, Agent, or Firm—Fitzpatrick, Cella, Harper & Scinto

(57) ABSTRACT

A laminating apparatus includes a lamination object conveying unit for conveying an object, a laminating film conveying unit for conveying the laminating film, and a heating-pressurizing unit for overlapping the object with the laminating film, and heating and pressurizing the object and the laminating film. A heat dissipating unit is disposed downstream from the heating-pressurizing unit in a conveying direction, with the heat dissipating unit dissipating heat from the object and the laminating film overlapped by the heating-pressurizing unit. In addition, a heating-pressurizing releasing unit releases the heating-pressurizing by the heating-pressurizing unit.

8 Claims, 12 Drawing Sheets

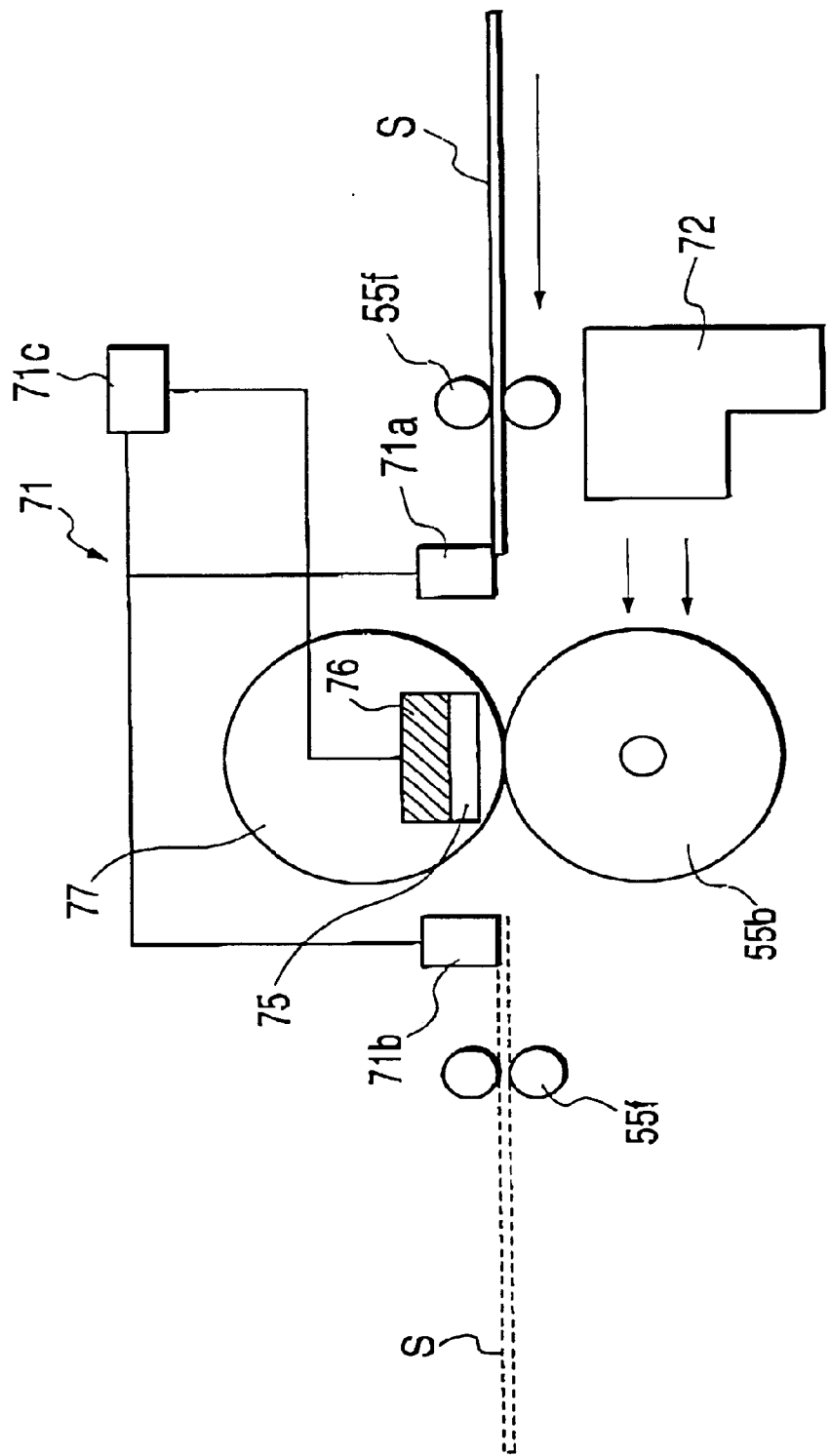

LAMINATION APPARATUS AND RECORDING APPARATUS

BACKGROUND OF THE INVENTION

1. Field of the Invention

The present invention relates to a laminating apparatus which performs a laminating treatment by overlapping a laminating film with an object to be laminated, and heating and pressurizing the laminating film and the object, thereby enclosing the object with the laminating film, and to a recording apparatus comprising the laminating apparatus.

2. Related Background Art

Recording apparatuses which have functions of printers, copiers, facsimiles and the like, or recording apparatuses which are used as output apparatuses for composite type electronic equipments including computers, wordprocessors and the like or for work stations are configured to record images (including characters, symbols and the like) on recording media such as recording paper, thin plastic sheets and the like on the basis of image information. Dependently on recording methods, the above described recording apparatuses can be classified into an ink jet type, a wire dot type, a thermal type, laser beam type and the like.

Out of these recording apparatuses, the ink jet type recording apparatus (ink jet recording apparatus) performs recording by discharging ink from recording means (a recording head) to the recording medium, permits easily configuring the recording means compact, is capable of recording a highly precise image at a high speed and is capable of recording on ordinary paper with no special treatment. Furthermore, the ink jet recording apparatus has merits that it requires a low running cost, that it is of a non-impact type which makes low noise, that it is capable of easily recording a color image using a large kinds of ink (for example, color ink) and the like.

Recording media usable with the ink jet recording apparatus are recording media which are made of recording materials such as paper, plastic sheets and the like as well as media composed of these materials (substrates) having surfaces on which ink absorbing layers having porous structures are formed by coating the surfaces with various kinds of fine inorganic materials to prevent ink from flurring.

Printers which are demanded to print high quality image in particular use coated paper exclusively for ink, carry out recording in photographic tones recently, tend to discharge a larger amount of ink and may be used at maximum water absorbing ratios of recording materials.

In order to further enhance qualities of recorded images, a certain recording apparatus is capable of enhancing an image quality and successively recording images excellent in weather resistance by forming an irreversibly changing transparent film on a recording surface of a recording material on which images have been formed.

A recording material having a layer which has an irreversibly changing physical property on a side of a recording surface is, for example, a material which has a porous polymer layer on a recording surface thereof. When this porous polymer layer is heated, the porous polymer layer becomes a transparent polymer film which covers and protects the recording surface. Furthermore, there is another recording material having a porous resin layer formed on a side of a recording surface, the layer being transformed into a transparent resin film covering a recording surface to protect the recording surface by heating the recording material. Any way, a transparent protective film is formed on a surface of a recording material by passing the recording material between a heating roller heated to a high temperature and a pressurizing roller for applying a high pressure so that a recording surface of the recording material is opposed to the heating roller. That is, the recording surface of the recording material is brought into contact with the heating roller, whereby a surface of the heating roller is transferred to a surface of the transparent porous layer of the recording material. When the surface of heating roller is injured, an injury is therefore transferred to the surface of the transparent porous layer, resulting in degradation of image quality.

As means for solving the above described problem to enhance an image quality and a weathering resistance, there is a method which forms a transparent polymer layer on a surface of a recording material after recording. That is, a surface of a recording material on which an image has been recorded and a surface of a porous polymer layer of the transferring material are opposed to each other and passed between a pair of rollers which are kept at a high temperature and a high pressure, thereby integrating the recording material with the transferring material by heat and pressure. After the integrated recording material is sufficiently cooled subsequently, only a plastic sheet is peeled off from a side of the transferring material, thereby forming a transparent porous polymer layer formed on the surface of the recording material. Since this method does not allow the rollers to be brought into direct contact with the porous polymer layer but brings the rollers to be brought into contact by way of the plastic sheet, thereby preventing the injury on the surface of the roller from being transferred to the porous polymer layer and providing a recording of a favorable quality.

However, the conventional example has the following problem. it is necessary to lower a temperature sufficiently when peeling off the plastic sheet from the recording material. A heat dissipating plate which dissipates heat from the recording material and the plastic sheet may therefore be disposed downstream of the heating roller and the pressurizing roller in a conveying direction. When fixing is carried out successively or a recording material having a large heat capacity is subjected to fixing, however, a temperature of a heat dissipating body is raised, whereby temperatures of the recording material and the plastic sheet may not be lowered sufficiently. When the plastic sheet is peeled off from the recording material in a condition where the recording material and the plastic sheet are not cooled to a predetermined temperature or lower, the plastic sheet may be peeled improperly from the surface or an end of the porous polymer layer, thereby degrading an image quality on the recording material. Though it is effective for suppressing the temperature rise of the heat dissipating body to dispose cooling means utilizing a fan or a thermo-module (Peltier element), the cooling means is remarkably expensive and is large in size.

SUMMARY OF THE INVENTION

An object of the present invention is to provide a laminating apparatus which shortens a time required for recording, and provides a recorded material having a high image quality, subjected to a laminating treatment, and a recording apparatus comprising the laminating apparatus.

Another object of the present invention is to provide a laminating apparatus which is configured to be capable of performing a high grade laminating treatment in a short time by carrying out drying and cooling of a sheet with a high efficiency, and a recording apparatus comprising the laminating apparatus.

Still another object of the present invention is to provide a laminating apparatus for laminating an object to be laminated with a laminating film, comprising a lamination object conveying means for conveying the object, laminating film conveying means for conveying the laminating film, heating-pressurizing means for overlapping the laminating film with the object, and heating and pressuring the laminating film and the object, heat dissipating means, disposed downstream the above described heating-pressurizing means in a conveying direction, for dissipating heat from the object and the laminating film overlapped by the above described heating-pressurizing means, and heating-pressurizing releasing means for releasing the heating-pressuring by the above described heating-pressurizing means.

BRIEF DESCRIPTION OF THE DRAWINGS

FIG. 12 is a diagram descriptive of drying means according to a sixth embodiment.

DETAILED DESCRIPTION OF THE PREFERRED EMBODIMENTS

Figure 1:
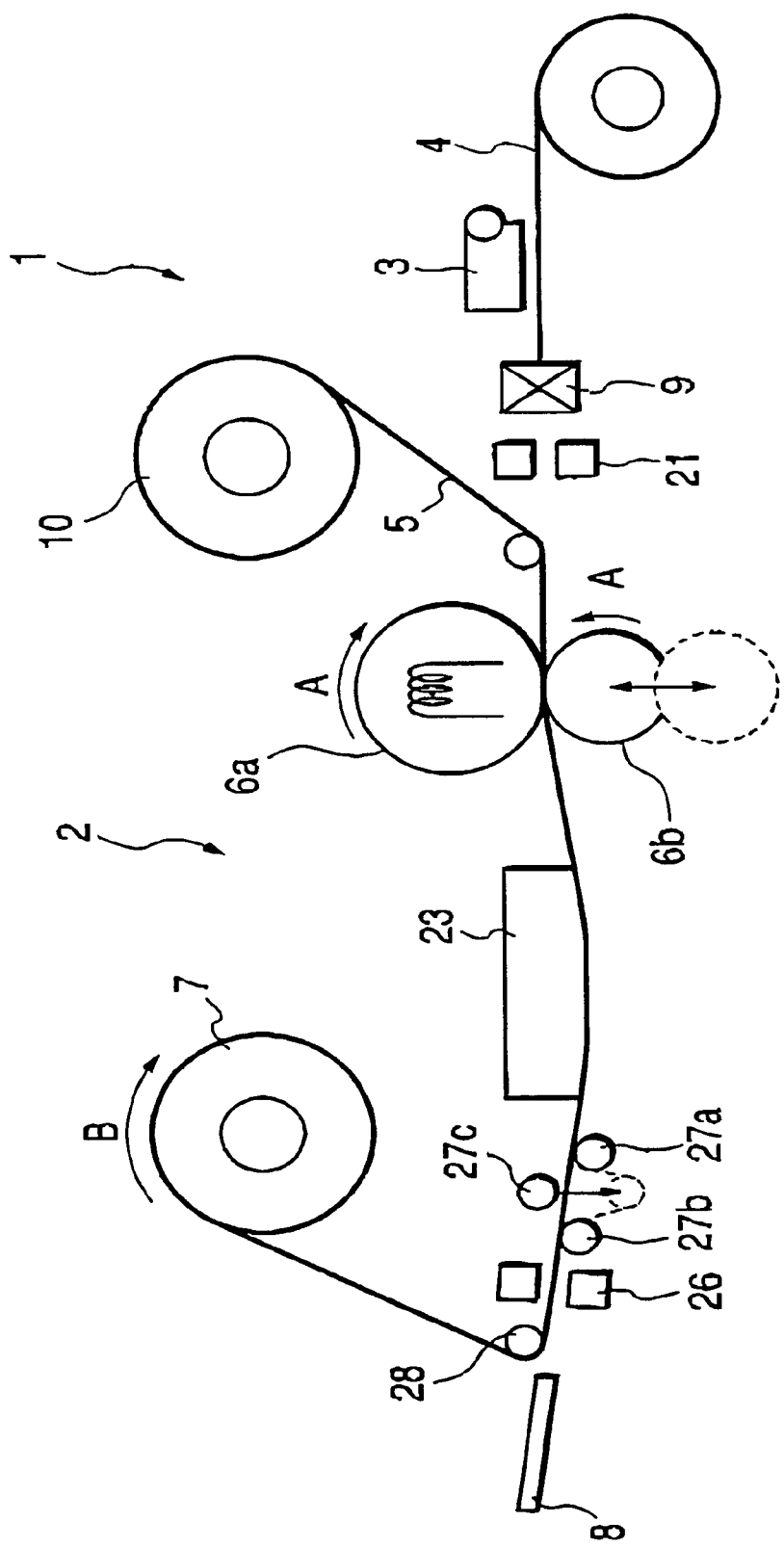
FIG. 1 is a schematic diagram of a laminating apparatus according to a first embodiment.

Now, embodiments of the present invention will be described with reference to the accompanying drawings.
(First Embodiment)

A first embodiment of the present invention will be described using FIGS. 1 and 2A to 2C.

First, description will be made of specific configuration of a recording medium which is an object to be laminated and a transparent film layer forming member (or referred to as a protective body) which is a laminating film to laminate the recording medium.

The protective body has a configuration in which a singular or plurality of thermoplastic resin film layers or latex layers are formed on a heat-resistant substrate.

Usable as the heat-resistant substrate is a film or a sheet which is made of material such as polyethylene terephthalate (PET), polyethylene naphthalate (PEN), polyphenylene sulfide (PPS), polyether sulfone (PES) or the like so far as the material is capable of stably maintaining a form in a heated-pressurized condition in addition to a pressure contact condition at a protective layer forming time, and can easily be peeled off at a stage where a transparent protective layer is formed on an ink absorbing layer, and a thickness of the heat-resistant substrate can be selected within a range, for example, from 18 $\mu$m to 50 $\mu$m. When the latex layers are to be used as resin layers, the protective body may have a configuration in which the thermoplastic particles from a layer which is fixed to the substrate at a degree not to easily come off the substrate and can be formed into a film by heating.

A latex layer can also be formed by applying a coating liquid by a roll coating method, a rod bar coating method, a spray coating method, an air knife coating method, a slot die coating method or the like and drying the coating liquid. A latex layer to be obtained must have a thickness which is finally brought into sufficiently close contact with an ink absorbing layer of a recording medium and required for bonding with no bubbles. The latex layer must have a thickness at least 70% to 150%, more preferably 100% to 150% of surface roughness Rmax of the ink absorbing layer of the recording medium.

A recording medium which has a surface having a property improved by the protective body described above and is capable of providing an excellent image quality can be formed, for example, as described below. Mentionable as a substrate is a plastic film made of polyethylene, polyethylene terephthalate (PET) or the like or a sheet made of a sheet material such as high quality paper, coated paper, laminated paper or the like. Usable as the ink absorbing layer to be coated over the surface of the substrate is a coat of a water-soluble polymer emulsion such as polyvinyl alcohol, vinyl acetate, acryl or urethane, a combination thereof or a coating material of the substance in which synthetic silica is dispersed thereto. The roll coating method, the rod bar coating method, the spray coating method or the slot die coating method is used as a coating method and the recording medium can be obtained by drying the plastic film after coating.

An image can be formed using the above described recording medium and transparent film layer forming member. Though various recording systems may be adopted for forming an image, an ink jet recording system is preferably utilizable. The ink jet recording system is not limited in particular and an electrostatic attraction system, a system using a piezoelectric element or a system using a heat-generating element may be used.

As ink used for ink jet recording may be employed into the ink jet recording system such as a coloring material such as a dye or a pigment contained in an aqueous solvent. For color recording, a full-color image can be formed by subtractive color mixture using cyan, magenta, yellow, and black (as occasion demands) according to a conventional procedure.

Using the transparent film layer forming member consisting of the heat-resistant substrate on which the transparent film layer forming material layer is disposed, the transparent film layer can be formed on the ink absorbing layer of the recording medium, for example, as described below. When an image is formed by discharging ink from the ink jet recording system to the ink absorbing layer of the recording medium in accordance with image information, the transparent film layer forming material layer of the transparent film layer forming member is overlapped to a surface on an ink absorbing layer side of the recording medium, and the transparent film layer forming material layer is pressed to the ink absorbing layer under pressure and transformed into a transparent film by pressurizing the transparent film layer forming material layer in a heated condition by a method which passes the recording medium and the transparent film layer forming member between a pair of rollers opposed to each other or a similar method. After sufficiently cooling the recording medium and the transparent film layer forming member, a recording having an image formed in the ink absorbing layer protected with the transparent film layer can be obtained by peeling off the substrate of the transparent film layer forming member from the transparent film layer.

Figure 2A:
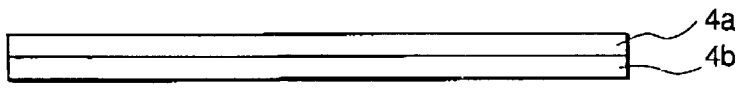
FIGS. 2A, 2B and 2C are schematic diagrams showing configurations of a recording medium and a transparent film layer forming member.
Figure 2B:
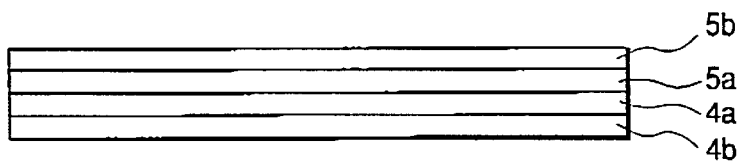
Figure 2C:
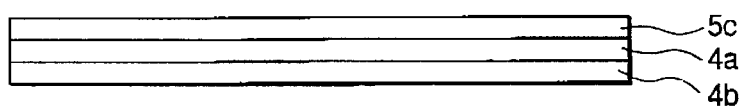

FIG. 1 is a schematic diagram of a laminating apparatus comprising a transparent film layer forming step according to a first embodiment of the present invention. FIGS. 2A to 2C are schematic diagrams showing configurations of a recording medium and a transparent film layer forming member.

The laminating apparatus shown in FIG. 1 comprises an ink jet recording section 1 which performs recording by discharging ink to a surface on a side of an ink absorbing layer of a recording medium 4 in a condition wound in a form of a roll and a laminating treatment section 2 which forms a transparent film layer on the ink absorbing layer subjected to recording.

The ink jet recording section 1 has an ink jet recording head 3 and forms an image by discharging ink to an ink absorbing layer 4a on a substrate 4b of the recording medium 4 shown in FIG. 2A. After the image is formed, the recording medium is cut in a predetermined size with a cutter 9.

Reference numeral 6a denotes a heating roller which has a halogen heater in a shaft for heating and a rotary encoder on a rotating shaft for detecting a rotational number of the above described roller. A reference numeral 6b denotes a pressurizing roller which is pressed to the heating roller 6a under a predetermined pressure by a pressurizing roller moving mechanism (not shown).

Reference numeral 21 denotes a first medium sensor which detects a leading end of the recording medium 4. Reference numeral 10 denotes a let-out gear (or device) for a transparent film layer forming member 5 and reference numeral 7 denotes a take-up gear for the transparent film layer forming member 5. When the leading end of the recording medium 4 is detected by the first medium sensor 21, the pressurizing roller 6b is brought into contact with the heating roller 6a under the predetermined pressure by the pressurizing roller moving mechanism (not shown) after a predetermined time, and a pair of rollers 6a and 6b which are heated and pressurized start rotating at predetermined speeds in directions indicated by arrows A in FIG. 1 and the take-up gear (or device) 7 for the transparent film layer forming member 5 starts rotating at a predetermined speed in a direction indicated by an arrow B in FIG. 1. The predetermined time is a time as measured from the detection of the leading end of the recording medium 4 with the first medium sensor 21 to attainment of the leading end of the recording medium 4 to the heating roller 6a.

A peripheral speed of the take-up gear 7 which has a clutch mechanism on a driving shaft (not shown) is set a little higher than a circumferential speed of the heating roller 6a, whereby a predetermined tension is always applied to the transparent film layer forming member 5. A similar clutch mechanism is disposed also on a side of the let-out gear 10, thereby applying a predetermined tension. The predetermined tension can be applied simply by braking a clutch without rotating the rotating shaft with a driving source. Both the tension on the side of the let-out gear 10 and the tension on a side of the take-up gear 7 are variable, and when the heating roller 6a and the pressurizing roller 6b are not nipped, the transparent film forming member 5 and the recording medium 4 are conveyed at a rotating speed of a gear involved in a higher tension. When the heating roller 6a and the pressurizing roller 6b are nipped, the transparent film layer forming member 5 and the recording medium 4 are conveyed at rotating speeds of the heating roller 6a and the pressurizing roller 6b.

Then, the transparent film layer forming member 5 is laminated over an ink absorbing layer 4a of the recording medium 4 having a formed image thereon, shown in FIG. 2B, from a side of the transparent film layer forming material layer 5a, and is passed between the heating roller and pressurizing roller while keeping a laminated condition, thereby being heated and pressurized. A heating temperature and a pressurizing force for the heating roller and the pressurizing roller can be set dependently on a kind of the transparent film layer forming material layer. By a treatment described above, the transparent film layer forming material layer 5a is contact bonded to (i.e., under pressure, brought into contact with) the ink absorbing layer 4a and transformed into a transparent film. At a fixing process, a take-up peripheral speed and a take-up diameter of the take-up gear 7 can be calculated from an output pulse P1 of a rotary encoder disposed on a shaft of the heating roller 6a and an output pulse P2 of a rotary encoder disposed on a shaft of the take-up gear 7.

When a tailing end of the recording medium 4 is detected with the first medium sensor 21 subsequently, the rotary encoder disposed on the shaft of the heating roller 6a monitors a rotating angle of the heating roller 6a until the tailing end of the recording medium 4 passes by the heating roller 6a. When the heating roller 6a has rotated for the above described angle, the pressurizing roller 6b is saved to a non-contact-bonding position by a pressurizing roller moving mechanism (not shown) which is used as heating-pressurizing releasing means. Though the first embodiment is configured to move the pressurizing roller 6b with the pressurizing roller moving mechanism which is adopted as a heating-pressurizing releasing means, the heating roller 6a may be configured to be movable.

Figure 3:
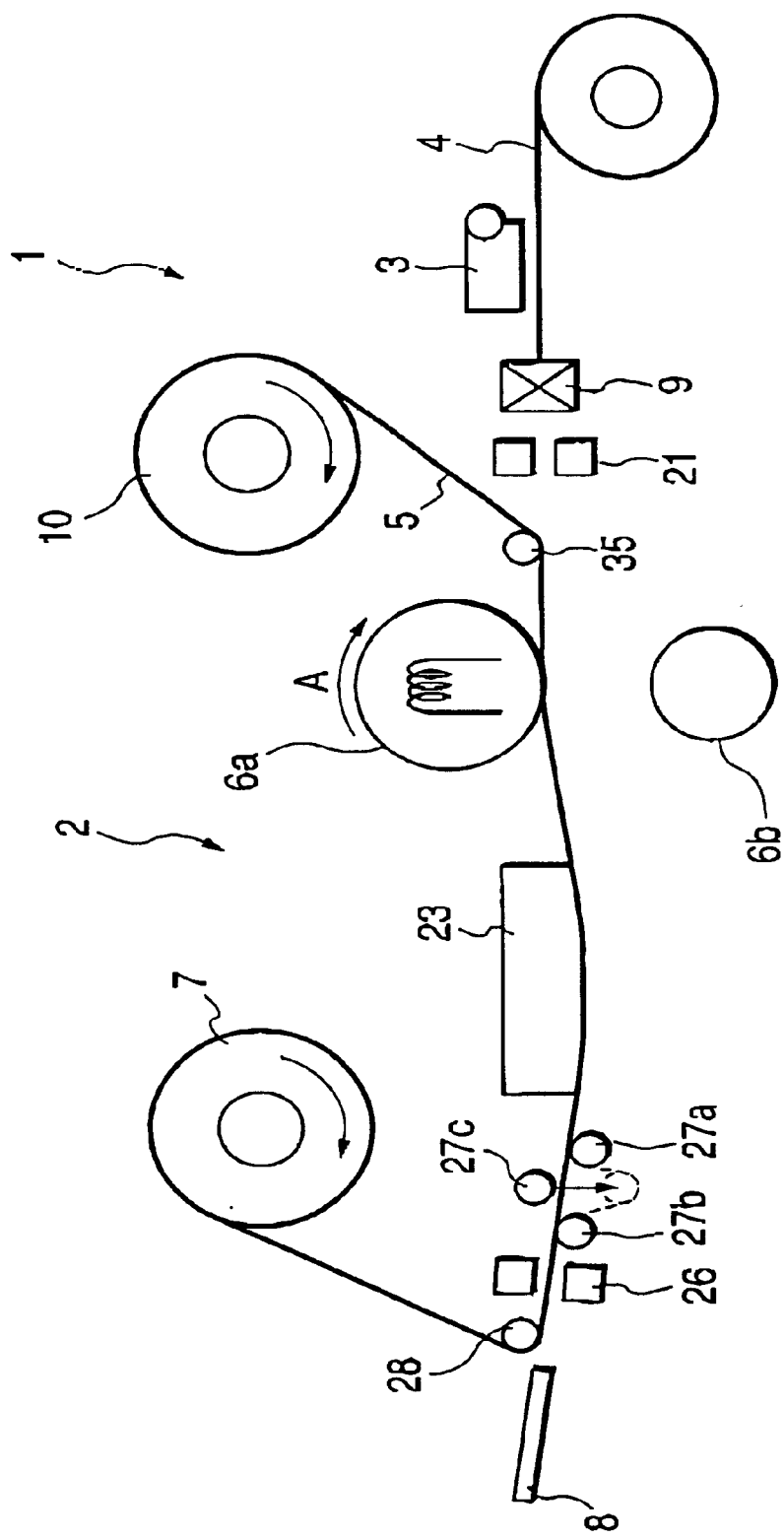
FIG. 3 is a schematic diagram of the laminating apparatus in a condition where a pressurizing roller is saved.

FIG. 3 is a schematic diagram of the laminating apparatus in a condition where the pressurizing roller 6b is saved. As described above, the portions of the transparent film layer forming member 5 and the recording medium 4 which are overlapped with each other are heated and pressurized by the heating roller and pressurizing roller, but the portion only of the transparent film layer forming member 5 which is free from the recording medium 4 is not heated or pressurized as shown in FIG. 3, whereby a temperature rise of the transparent film layer forming member 5 can be avoided. Furthermore, the first embodiment is capable of preventing the transparent film layer forming member 5 from being wrinkled by thermal shrinkage caused when only the transparent film layer forming member 5 is brought into contact with the heating roller 6a.

When the pressurizing roller 6b is saved to the non-contact-bonding position, a driving force of the heating roller 6a cannot be transmitted to the transparent film layer forming member 5 and the recording medium 4, whereby the transparent film layer forming member 5 and the recording medium 4 cannot be conveyed. Instead, the transparent film layer forming member 5 and the recording medium 4 are conveyed with a driving force of the take-up gear 7. When the pressurizing roller 6b is saved to the non-contact bonding position, the tension on the side of the take-up gear 7 is made higher than that on the side of the let-out gear 10, thereby conveying the transparent film layer forming member 5 and the recording medium 4 toward the take-up gear 7. The tension on the side of the let-out gear 10 may be lowered instead of enhancing the tension on the side of the take-up gear 7. However, the tensions must be set at adequate values since wrinkling at a fixing step and a separation step are largely influenced due to absolute values of the tensions on the side of the take-up gear 7 and the side of the let-out gear 10 as well as a relation between these tensions.

Then, heat of the transparent film layer forming member 5 and the recording medium 4 is abruptly taken by a heat dissipating body 23 which is heat dissipating means disposed downstream in the conveying direction, and the transparent film layer forming member 5 and the recording medium 4 are cooled to a temperature close to that of the heat dissipating body 23. Since a heat capacity of the heat dissipating body 23 is set prettily larger than those of the transparent film layer forming member 5 and the recording medium 4, a temperature rise is small for the heat dissipating body 23 which takes the heat from the transparent film layer forming member 5 and the recording medium 4. The portion having only the transparent film layer forming member 5 which is not in contact with the heating roller 6a is at a low temperature and does not raise a temperature of a heat dissipating body 23 even if the portion is brought into contact with the heat dissipating body 23. By bringing the transparent film layer forming member 5 rather positively into contact with the heat dissipating body 23, it is possible to conduct heat from the heat dissipating body 23 to the transparent film layer forming member 5, thereby lowering a temperature of the heat dissipating body 23.

The heat dissipating body 23 is convex in the conveying direction so that the heat dissipating body 23 is brought into contact with the transparent film layer forming member 5. The transparent film layer forming member 5 and the recording medium 4 which are heated to a high temperature by the heating roller and the pressurizing roller are cooled from a side of the transparent film layer forming member 5. It is for efficient heat dissipation that the heat dissipating body 23 is cooled from the side of the transparent film layer forming member 5. It is the transparent film layer forming material layer 5a of the transparent film layer forming member 5 and the ink absorbing layer 4a of the recording medium 4 that are to be originally cooled. However, the heat dissipating body 23 is cooled from the side of the transparent film layer forming member 5 which has a high heat conduction efficiency since it is impossible to cool only an internal portion of the heat dissipating body 23. However, a heat dissipating body may be disposed on a side of the recording medium 4 when a heat conduction efficiency is not different so large between the transparent film layer forming member 5 and the recording medium 4 or when the recording medium 4 has a higher heat conduction efficiency. When the heat dissipating body is disposed on the side of the recording medium 4, both ends of the heat dissipating body 23 are brought into contact with the transparent film layer forming material layer 5a since the transparent film layer forming member 5 is wider than the recording medium 4. The transparent film layer forming material layer 5a has adhesion material to enhance adhesion to the recording medium 4. In order to prevent a trouble from being caused due to adhesion of the adhesion material to the heat dissipating body 23, a fluorine-based coating, a silicon-based coating or the like is applied over a surface of the heat dissipating body 23.

A heat dissipating property of the heat dissipating body 23 can be enhanced, for example, by using a material such as aluminum which has a remarkably high heat conductivity. Furthermore, since the heat dissipating body 23 is disposed at a position to push the transparent film layer forming member 5 as shown in FIG. 1, the transparent film layer forming member 5 is pulled under a predetermined tension by the take-up gear 7, whereby the transparent film layer forming member 5 is in contact with the heat dissipating body under a predetermined pressure 23 so as to enhance heat conduction.

Reference numeral 26 denotes a second medium sensor which detects the leading end of the recording medium 4. Reference numeral 27 denotes a tailing end separating mechanism which separates the tailing end of the recording medium 4, and consists of a fixed guides 27a, 27b and a movable separating shaft 27c. From a length of the recording medium 4 in the conveying direction and a positional relation between the second medium sensor 26 and the tailing end separating mechanism 27, the rotary encoder of the heating roller 6a starts to count a predetermined pulse when the second medium sensor 26 detects the leading end of the recording medium 4, thereby controlling the tailing end separating mechanism 27. At the trailing end of the recording medium 4, the substrate 5b of the transparent film layer forming member 5 can be separated with the movable separating shaft 27c which speedily pushes out the tailing end of the recording medium 4 from a side of the transparent film layer forming member 5. A sheet path which is bent abruptly by a fixed guide 28 does not allow the recording medium 4 having high rigidity and the transparent film layer forming layer 5a to pass through the sheet path together with the substrate 5b, thereby separating the leading end of the recording medium 4. Accordingly, it is possible to obtain a recording 8 having a transparent film layer 5c shown in FIG. 2c on the ink absorbing layer 4a on which an image is recorded.

After the recording 8 is output, the transparent film layer forming member 5 on a section from the heating roller 6a to the fixed guide 28 is not in contact with the recording medium 4 and not heated by the heating roller 6a. Furthermore, the transparent film layer forming member 5 can be reused since the transparent film layer forming layer 5a remains on the transparent film layer forming member 5. The transparent film layer forming member 5 can be reused by rotating the let-out gear 10 for a predetermined angle in a reverse direction. At this stage, the transparent film layer forming member 5 which is at a low temperature is in contact with the heat dissipating body 23 and can take heat from the heat dissipating body 23.

The driving force of the let-out gear 10 is utilized for rewinding the transparent film layer forming member 5. By changing balance between the tension of the let-out gear 10 and the tension of the take-up gear 7 so as to enhance the tension of the let-out gear 10, the transparent film layer forming member 5 is rewound toward the let-out gear 10. A rewound amount is controlled by counting a conveyance amount of the transparent film layer forming member 5 utilizing a rotary encoder which is disposed on a guide roller 35.

After the transparent film layer forming member 5 and the recording medium 4 are heated and pressurized by the heating roller and the pressurizing roller, the pressurizing roller 6b is saved to the non-contact-bonding position by the pressure roller moving mechanism. At this time, a counter of the rotary encoder of the guide roller 35 is reset (C=0). Then, the counter is allowed to count up (C=C+1) as the transparent film layer forming member 5 and the recording medium 4 are conveyed toward the fixed guide 28 to separate the transparent film layer forming member 5 and the recording medium 4. After the recording 8 is output and a series of separating operations are completed ($C=C_1$), the transparent film layer forming member 5 is rewound by driving the let-out gear 10. This rewinding operation is continued till $C=0$ while allowing the counter to count down ($C=C-1$). The rewinding operation makes it possible to effectively use the transparent film layer forming member with reusing an already used transparent film layer forming member when a recording medium subjected to recording is conveyed next to the heating roller 6a or without using unused transparent film layer forming member in waste.

At a stage to rewind the transparent film layer forming member 5 which can be reused after the recording 8 is separated from the transparent film layer forming member 5, in the first embodiment, the transparent film layer forming member 5 is brought into contact with the heat dissipating body 23 kept at a high temperature to take heat from the heat dissipating body 23 to the transparent film layer forming member 5, but this rewinding operation is not limitative.

In place of resetting the counter from $C=C_1$ to $C=0$ as described above at a stage to rewind the transparent film layer forming member 5, control may be performed so as to return the counter again to $C=0$ after passing a position to which the counter is originally to be returned ($C=0$):

$$C=C_1 \to C=0 \to C=-C_2 C=0$$

When the transparent film layer forming member 5 is controlled in this way, the transparent film layer forming member 5 is brought into contact with the heat dissipating body 23 in a larger amount, thereby making it possible to take much heat from the heat dissipating body 23. However, a contact time (time required for rewinding) is also prolonged as the transparent film layer forming member 5 is brought into contact in a larger amount and it is necessary to contrive so as to shorten the time required for rewinding or the like by a little enhancing a rewinding speed.

Furthermore, it is possible to control the transparent film layer forming member 5 so as to reciprocate between $C=C_1$ and $C=0$ as follows:

$$C=C_1 \Leftrightarrow C=0$$

It is possible to dispose a temperature sensor on the heat dissipating body 23 and control the transparent film layer forming member 5 so as to stop at a position of $C=0$ by stopping contact slide of the transparent film layer forming member 5 and the heat dissipating body 23 after the heat dissipating body 23 is cooled to a predetermined temperature.

The above described configuration which comprises means for releasing the heating and pressurizing by a heating roller and a pressurizing roller, makes it possible to heat and pressurize portions of the transparent film layer forming member and the recording medium which are overlapped with each other, and not heat or pressurize a portion having only the transparent film layer forming member. Accordingly, the configuration makes it possible to suppress a temperature rise of the heat dissipating body, shorten the time required for recording and prepare the recording which is subjected to the laminating treatment and has a high image quality.

(Second Embodiment)

A laminating apparatus according to a second embodiment of the present invention will be described using FIG. 4. The laminating apparatus according to the second embodiment is configured to change a sliding speed between a transparent film layer forming member 5 and a heat dissipating body 23 in accordance with a temperature of the heat dissipating body 23, thereby lowering the temperature of the heat dissipating body 23. A fundamental configuration and operations till a step of outputting a recording 8 are the same as those in the first embodiment and will not described in particular.

Figure 4:
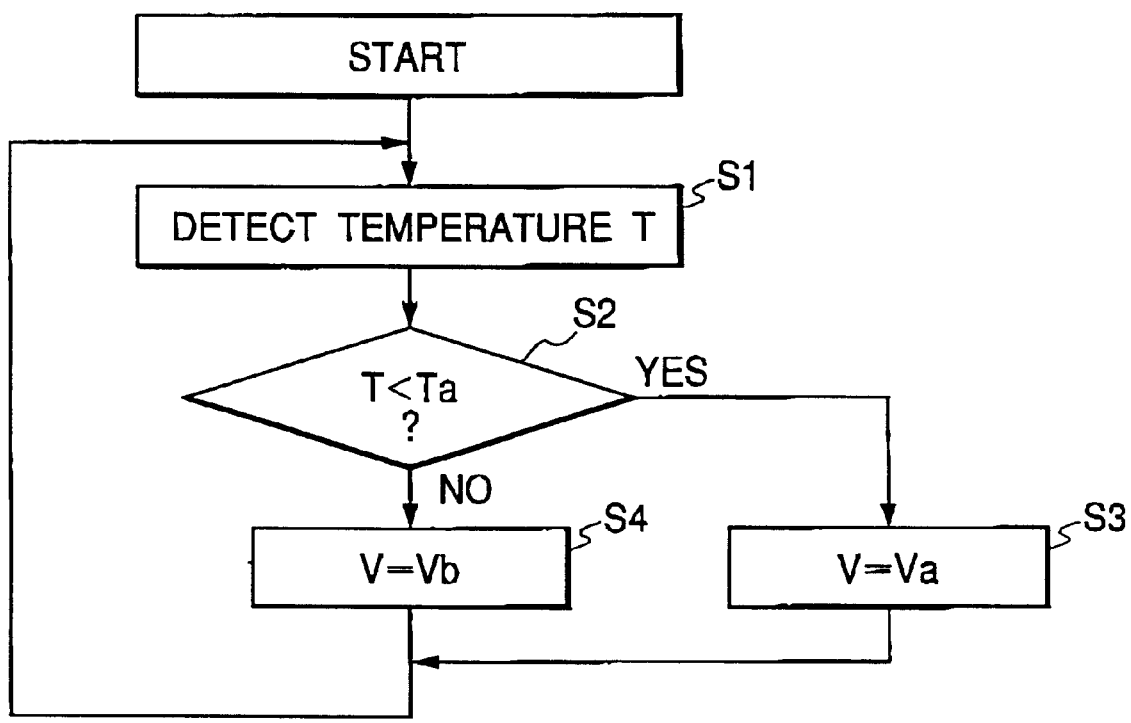
FIG. 4 is a flow chart for determining sliding speeds of a transparent film layer forming member and a heat dissipating body according to a second embodiment.

FIG. 4 is a flow chart for determining a sliding speed between the transparent film layer forming member and the heat dissipating body 23. Operations will be described with reference to this flow chart.

After a recording 8 is output, a temperature T of the heat dissipating body 23 is detected (S1). This temperature T of the heat dissipating body 23 is compared with a standard temperature Ta (S2), and when the temperature T of the heat dissipating body 23 is lower than the standard temperature Ta, it is judged that the heat dissipating body 23 does not require cooling and a rewinding speed V is set at a level Va which is rather high for the transparent film layer forming member 5 (S3). A fast rewinding speed allows the heat dissipating body 23 to be in contact for a short time with the transparent film layer forming member 5 which is at a low temperature, whereby heat is conducted in a small amount from the heat dissipating body 23 to the transparent film layer forming member 5 but a time required for rewinding can be shortened.

When the temperature T of the heat dissipating body 23 is higher than the standard value Ta, on the other hand, it is judged necessary to abruptly lower the temperature of the heat dissipating body 23 and a rewinding speed V is set at a level Vb which is rather slow for the transparent film layer forming member 5. (S4). A slow rewinding speed allows the heat dissipating body 23 to be in contact for a long time with the transparent film layer forming member 5 which is at the low temperature, whereby heat is conducted in a large amount from the heat dissipating body 23 to the transparent film forming member 5 and the temperature of the heat dissipating body 23 can be lowered. However, a long time is required for rewinding.

Though the temperature T of the heat dissipating body 23 is compared with the standard temperature Ta and the rewinding speed V of the transparent film layer forming member 5 is controlled so as to be switchable between the two levels of Va and Vb in the second embodiment, it is possible to change a speed steplessly dependently on the temperature T of the heat dissipating body 23 without setting the standard temperature Ta.

(Third Embodiment)

Figure 5:
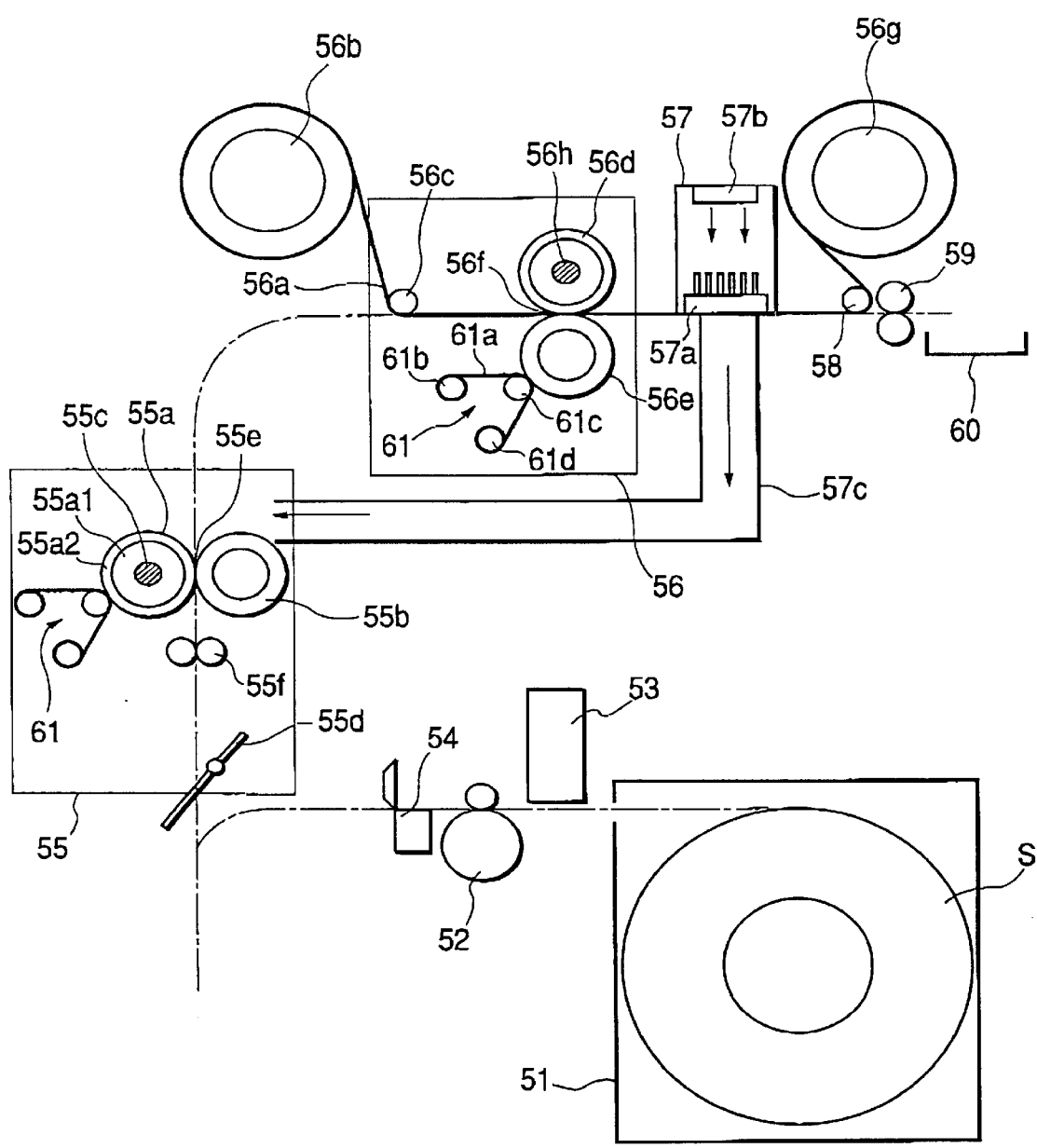
FIG. 5 is a schematic diagram of an ink jet recording apparatus according to a third embodiment.
Figure 6:
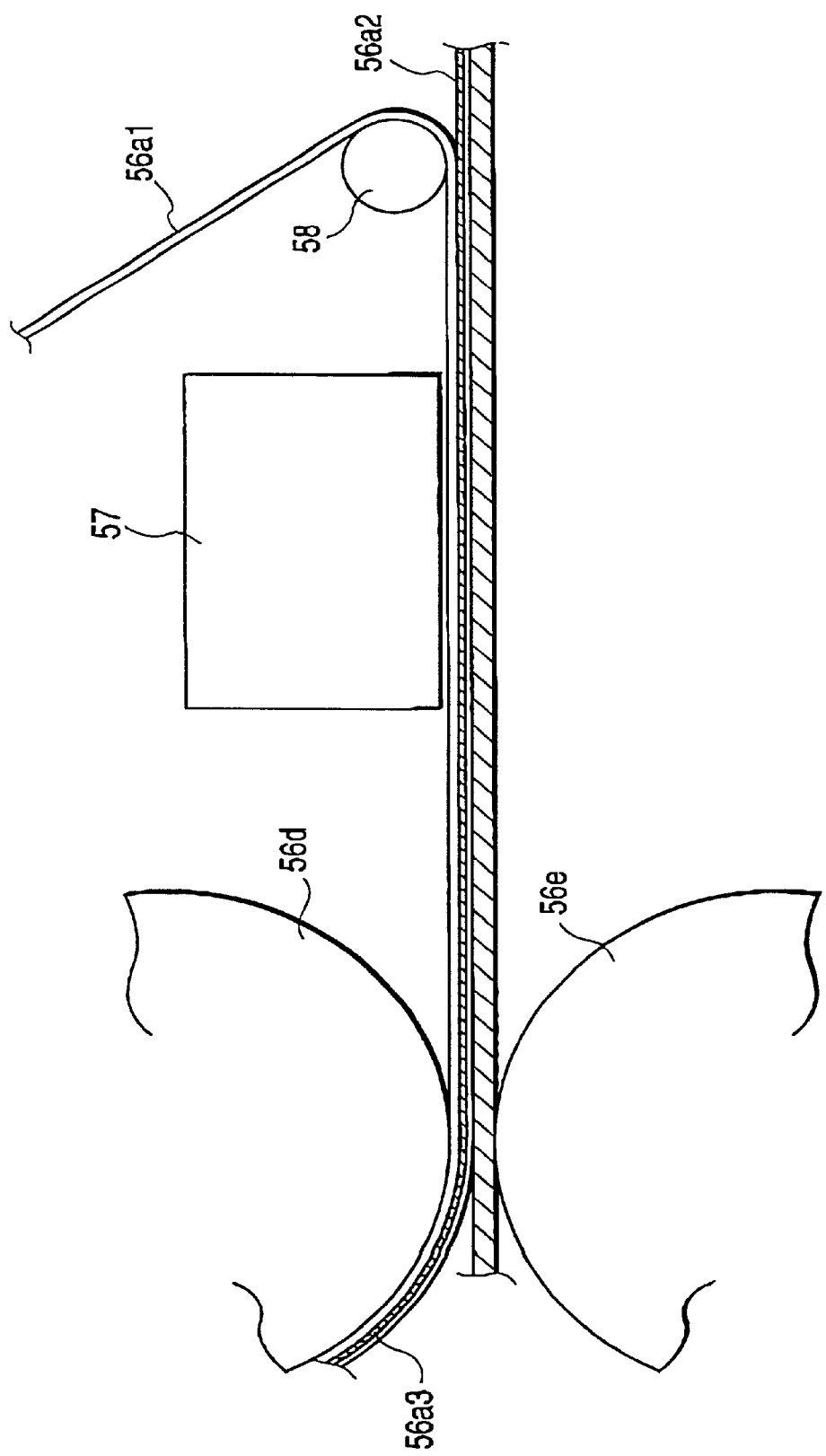
FIG. 6 is a diagram descriptive of a laminating step.
Figure 7:
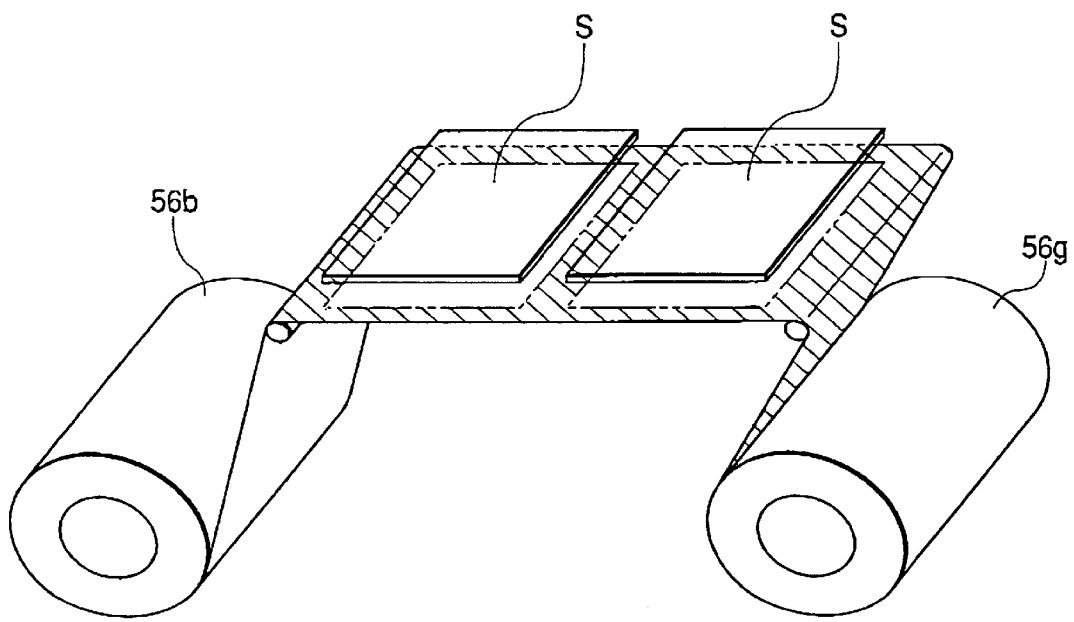
FIG. 7 is a schematic diagram of the laminating step.
Figure 8:
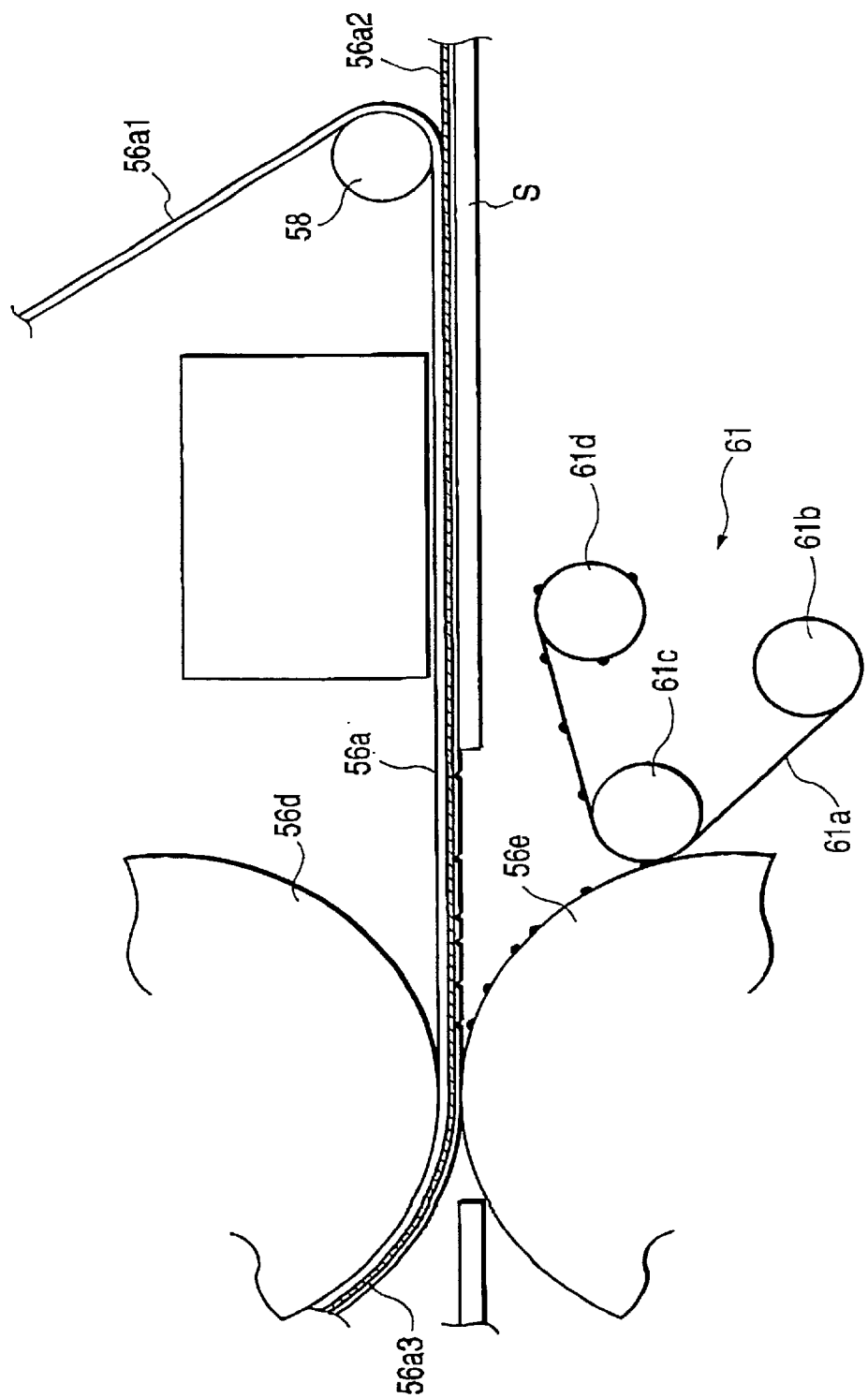
FIG. 8 is a diagram descriptive of a cleaning step of a fixing roller.

Referring to FIGS. 5 to 8, description will be made of an ink jet recording apparatus comprising a laminating apparatus according to the third embodiment. FIG. 5 is a schematic diagram of the ink jet recording apparatus, FIG. 6 is a diagram descriptive of a laminating step, FIG. 7 is a schematic diagram of the laminating step and FIG. 8 is a diagram descriptive of a cleaning step for a fixing roller.

{Overall Configuration}

In FIG. 5, a recording sheet S which is rolled in a sheet cartridge 51 is intermittently fed with a high precision by conveying means such as a conveying roller 52 or the like and an image is formed on a surface of the recording sheet S by recording means 53. Tough a rolled paper is used as the recording sheet in the third embodiment, the recording sheet is not limited to the rolled paper and may be a cut paper or a plastic sheet made of a material other than paper.

After recording, the recording sheet S is cut in a predetermined length with a cutter 54 and fed to drying means 55 which eliminates excessive moisture content from the recording sheet S. The recording sheet S is fed to fixing means 56 functioning as laminating means which transfers a laminating film to a recording surface, fixes an image and makes a surface glossy. Then, the recording sheet S is cooled by cooling means 57, separated from a laminating base film by a separating roller 58 which composes separating means and discharged into a discharge tray 60 by a discharging roller 59. Then, configurations of the above described members will be described specifically.

{Recording Means}

Used as recording means in the third embodiment is a serial type ink jet recording system. That is, the ink jet recording system uses an ink jet recording head mounted on a carriage (not shown) which is capable of reciprocating in a direction intersecting with (perpendicular to in the third embodiment) a rolled paper conveying direction and records an ink image on the recording sheet S by discharging ink from the recording head according to an image signal in synchronization with reciprocation of the carriage. For this purpose, the recording head comprises a fine liquid discharge port (orifice), a liquid path, an energy exerting portion disposed in the liquid path and energy generating means for generating a liquid droplet producing energy to be exerted to a liquid in the above described exerting portion.

Energy generating means for generating such an energy is available with a recording method using an electromechanical transducer such as a piezoelectric element, a recording method using energy generating means which heats a liquid by irradiation with an electromagnetic wave such as a laser and discharges a liquid droplet with a function of the heat generation, a method using energy generating means which discharges a liquid by heating a liquid with an electrothermal transducer such as heat-generating element having a heat-generating resistor or the like.

Out of recording heads used for recording methods, recording heads used for the ink jet recording method are capable of recording with high resolution since the recording heads permit arranging at high densities liquid discharge ports (orifices) which form and discharge recording liquid droplets. Out of the recording heads, a recording head which uses an electrothermal transducer as energy generating means is advantageous since the recording head can easily be configured compact, mounted at a high density and manufactured at a low cost.

The third embodiment is configured to perform recording by supplying an electric current to an electrothermal transducer in accordance with a recording signal and discharging ink from discharge ports by growing and contracting bubbles produced in the ink utilizing film boiling produced in the ink by heat energy of the electrothermal transducer.

After completion of recording, the recording sheet S is fed rapidly to a location passing through the cutter 54 and cut. The cut recording sheet S is conveyed to the drying means 55 by a conveying system (not shown). Simultaneously, the recording sheet S on a side of a roll is pulled back to a recording ready location by reverse rotations of a conveying roller 2 and a recording sheet roll.

The recording apparatus according to the third embodiment is capable of preparing a recording which is highly glossy and excellent in weathering resistance since the recording sheet into which ink has been injected from the ink jet recording head is coated with transparent resin by the fixing means 56 functioning as the laminating means as described above. Since the ink contains a large amount of water, however, the recording sheet must be dried when the recording sheet into which a large amount of ink has been injected is to be laminated immediately after recording.

{Drying Means}

The third embodiment uses the drying means 55 for drying the recording sheet in a short time. That is, the drying means forcibly evaporates the moisture contained in the recording sheet before coating the recording sheet injected with the large amount of ink.

Description will be made specifically of a configuration of the drying means 55. In FIG. 5, reference numeral 55a denotes a drying-heating roller which is configured as a hollow heating member having a surface made of silicone rubber, reference numeral 55b denotes a drying-pressurizing roller which is configured as a pressed member pressed to the drying-heating roller 55a by a pressing mechanism (not shown) and has a surface made of silicone rubber, and reference numeral 55c denotes a halogen lamp which is inserted into a hollow portion of the hollow drying-heating roller 55a and functions as a heater for heating the drying-heating roller 55a. Furthermore, reference numeral 55d denotes a carrying path switching flap which rotates so as to form a conveying path connecting the recording means 53 to the drying means 55 when the recording sheet subjected to recording and cut is to be led to the drying means 55 or form a conveying path connecting the drying means 55 to the fixing means 56 when the dried recording sheet is to be led to the fixing means 56. Reference numeral 55e denotes a drying nip formed by the drying-heating roller 55a and a drying-pressurizing roller 55b, and reference numeral 55f denotes a holding-conveying roller which sandwiches the recording sheet.

The heating roller 55a is rotatingly driven by a driving mechanism (not shown). The heating roller 55a is configured to have a silicone rubber layer 55a2 outside a cylindrical shaft 55a1 made of aluminum and a PFA tube wound around a surface of the silicone rubber layer 55a2. Furthermore, a halogen lamp 55c is built in the cylindrical shaft 55a1 made of aluminum and the heating roller 55a is heated when the halogen lamp 55c is lit by a power source mechanism (not shown). When a power source for the recording apparatus is turned on, the heating roller 55a is set in an idling condition and is heated to a definite temperature.

The pressurizing roller 55b is a foamed sponge roller and pressed against the heating roller 55a by a pressurizing mechanism (not shown) when the recording sheet is to be heated.

Then, the recording sheet S on which an image is recorded by the ink jet recording head is conveyed by the holding-conveying roller 55f, reaches the drying means and passes through a drying nip 55e, thereby being abruptly heated. After having passed by the drying nip 55e, water steam is produced from a surface of the recording sheet S, but is removed and exhausted outside since heated air which is led from cooling means 57 through a blow tunnel 57c is supplied to the surface of the recording sheet. Since the air supplied at this time is heated by the cooling means 57, the air can be exhausted outside while accelerating drying of the recording sheet and preventing the water steam from being condensed. Furthermore, the heating roller 55a is controlled so as to be at a surface temperature set for an ink discharge rate so that the surface of the recording sheet is appropriately dried in accordance with an amount of ink discharged from the recording head and heat is not supplied in an excessive amount.

Since the moisture is evaporated abruptly by the drying means 55 as described above, the recording sheet contains a small amount of moisture, water steam is produced in a small amount and production of bubbles can be prevented even when the recording sheet is heated to a high temperature in the fixing means 56. Furthermore, since a small amount of heat energy is taken by vaporizing heat even when the recording sheet is heated to a high temperature in the fixing means 56, the recording sheet can be heated to a temperature close to that of the fixing roller and a heat energy sufficient for denaturating the laminating layer can be supplied. In other words, the fixing roller is usable at a lower temperature for supplying heat energy in an identical amount. Furthermore, the drying means 55 lowers a specific heat (heat capacity) of the recording sheet, thereby allowing the recording sheet to be heated to a temperature close to that of the fixing roller and being capable of maintaining a temperature sufficient for denaturating the laminating layer.

Furthermore, water steam is produced in a small amount after the recording sheet has passed through the drying nip, whereby the water steam is not enclosed when the recording sheet is sealed in the fixing nip and does not degrade adhesion between the recording sheet and a transferring sheet.

Furthermore, since the recording sheet is at a high temperature, the fixing means 56 is capable of heating the recording sheet to a temperature close to that of the fixing roller in a short time and maintaining a temperature sufficient for denaturating the laminating layer for a short time of passage through the nip (e.g. 0.1 to 0.3 sec.). In other words, the fixing roller is usable at a lower temperature for heating the recording sheet to an identical temperature.

The recording medium from which the moisture has been evaporated by the drying means as described above is subjected to a laminating treatment in the fixing means 56. Then, description will be made specifically of a configuration of the fixing means (laminating means).

{Fixing Means}

After passing through the drying nip 55e, the recording sheet passes through a fixing-conveying system and the leading end is brought into contact with a transferring sheet 56a. The transferring sheet 56a is composed of a base material 56a1 on which a surface material layer 56a2 and an adhesive layer 56a3 are formed as shown in FIGS. 6 and 7, and integrated with the recording sheet S by pressurizing and heating the adhesive layer 56a3 to the recording sheet S, and after transferring sheet is cooled by the cooling means 57, the surface of the recording sheet is coated with the surface material layer 56a2 by way of the adhesive layer 56a3 by peeling off the base material 56a1.

The transferring sheet 56a is wound around a take-up roll 56g from a let-out roll 56b via a guide roller 56c and a fixing nip 56f which is formed between a fixing-heating roller 56d subjected to a silicon-based or fluorine-based surface treatment and a fixing-pressurizing roller 56e having a surface made of silicone rubber and covered with a fluorine-based tube. Reference numeral 56h denotes a fixing heater which is inserted into a hollow portion of the hollow fixing-heating roller 56d for heating the fixing-heating roller 56d. A take-up roll 56g is configured to be rotatingly driven in a direction to wind up the transferring sheet 56a and restricted by a predetermined torque for rotation in a direction to rewind the transferring sheet 56a. In contrast, the let-out roll 56b is configured to be rotatingly driven in a direction to rewind the transferring sheet 56a and regulated by a predetermined torque for rotation in a direction to wind up the transferring sheet 56a. That is, a tension is applied to the transferring sheet 56a in both a winding up direction and rewinding direction to prevent the transferring sheet 56 from being wrinkled. The transferring sheet 56a is slightly wider than the recording sheet S so that an entire surface of the recording sheet can be covered even when the transferring sheet 56a and the recording sheet S are slightly deviated in a width direction.

The recording sheet S is first brought into contact with the transferring sheet 56a and inserted into the fixing nip 56f together with the transferring sheet 56a for pressurizing and heating. By bringing the recording sheet S first into contact with the transferring sheet 56a, it is possible to bent the leading end of the recording sheet and prevent the recording sheet from being pressurized and heated in a folded condition. Then, the recording sheet S is cooled by the cooling means 57, subjected to gradient separation by a separating roller 58 which composes separating means and is discharged by a discharge roller 59 into a discharge tray 60.

The third embodiment uses cleaning means for cleaning the fixing-pressurizing roller 56e at the above described fixing step. In a case where the recording sheet S is inserted into the fixing nip 56f together with the transferring sheet 56a, the adhesive layer at a portion opposite to the recording sheet is transferred to the recording sheet, but the adhesive layer 56a3 which is outside a range of the recording sheet is brought into contact with a surface of the fixing-pressurizing roller 56e since the transferring sheet 56a is wider than the recording sheet S. Even when recording sheets S are inserted successively, an interval between the sheets cannot be zeroed to prevent the sheet from being overlapped and the adhesive layer 56a3 at a portion corresponding to the interval between the sheets is brought into contact with the surface of the fixing-pressurizing roller 56e.

Though the surface of the fixing-pressurizing roller is covered with the fluorine-based tube and has a property which hardly allows adhesion of foreign matters and permits easy removal of adhered foreign matters, the above described configuration does not allow the fixing-pressurizing roller to completely prevent foreign matters (a portion of the adhesive layer 56a3 and the like) from adhering. When foreign matters adhere to the surface of the fixing-pressurizing roller, the foreign matters transfer to the adhesive layer 56a3 of the transferring sheet 56a as the roller rotates and finally to the surface of the recording sheet, thereby degrading a recording quality.

In order to wipe off foreign matters, the foreign matters are wiped off by bringing an unwoven fabric 61a into contact with the surface of the fixing-pressurizing roller 56e as shown in FIG. 8 in the third embodiment.

In FIG. 8, reference numeral 61 denotes cleaning means, reference numeral 61a denotes an unwoven fabric wound in a form of a roll which is taken by a take-up roll 61d from a let-out roll 61b by way of a pressing roller 61c. The pressing roller 61c is made of foamed rubber and pressed to the fixing-pressurizing roller 56e by a pressurizing member (not shown). Accordingly, the unwoven fabric 61a is pressed to the surface of the fixing-pressurizing roller 56e. When the fixing-pressurizing roller 56e rotates, the unwoven fabric 61a takes adhering foreign matters from the fixing-pressurizing roller 56e into among fibers, thereby wiping off the foreign matters from the surface of the fixing-pressurizing roller 56e. The take-up roll 61d can be rotated intermittently by a driving mechanism (not shown) and is rotated to pull out a new unwoven fabric surface to a portion which is in contact with the surface of the fixing-pressurizing roller 56e when a pretty amount of foreign matters adhere to the portion of the unwoven fabric 61a which is in contact with the surface of the fixing-pressurizing roller 56e. This mechanism maintains the surface of the fixing-pressurizing roller 56e always in a condition free from adhering foreign matters.

In addition, a mechanism similar to the cleaning means 61 is disposed also in the vicinity of the drying-heating roller 55a of the drying means 55 to remove contaminant transferred from a roller surface to a recording surface.

{Cooling Means}

Now, description will be made of the cooling means 57. The cooling means 57 used in the third embodiment consists of a cooling metal plate 57a, an air blow fan 57b and an air blow tunnel 57c.

When the recording sheet S which is heated by the fixing means 56 is conveyed to the cooling means 57, the recording surface is brought into direct contact with the metal plate 57a for heat dissipation. The metal plate 57a is heated by heat conducted from the recording sheet S. A rear portion of this metal plate 57a is configured in a form of a fin and the metal plate 57a is cooled by blowing air to the fin portion from the air blow fan 57b. Air blown at this time and heated by the metal plate 57a sent to the drying means 55 through the air blow tunnel 57c and serves for drying the recording sheet as described above.

Since the recording sheet on which an image is recorded is abruptly heated by the drying means 55 so as to evaporate moisture and abruptly cooled by the cooling means 57 after lamination, the recording sheet which contains a large amount of moisture can be laminated in a short time.

Furthermore, since heat produced by cooling the recording sheet is used for removing water steam by the drying means 55, the recording sheet can be dried and cooled with a high efficiency.

Furthermore, a fan is usable for preventing the cooling means from being heated and removing water steam produced by the drying means by means of only one fan, thereby making it possible to simplify a configuration of the cooling means.

In addition, a similar effect can be obtained by configuring a system from the drying means 55 to the discharge tray 60 as an independent laminating apparatus and performing a laminating treatment of an externally obtained recording with the laminating apparatus though the third embodiment is described as an example in which the recording sheet having an image recorded by the recording means is dried, laminated, cooled and discharged.

(Fourth Embodiment)

Figure 9:
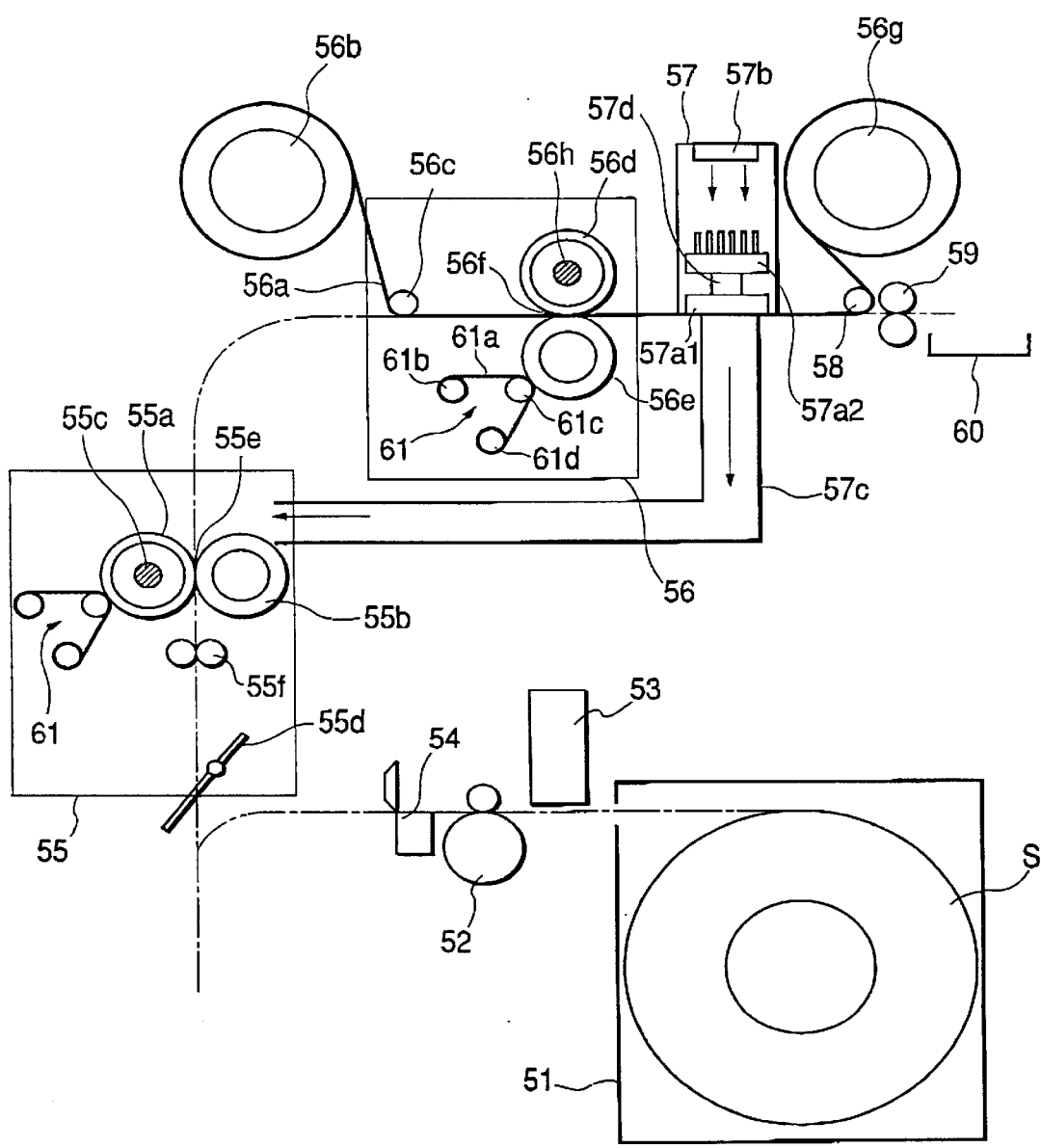
FIG. 9 is a schematic diagram of an ink jet recording apparatus according to a fourth embodiment.

Now, description will be made of a fourth embodiment which is configured to more efficiently perform the heating by the drying means and the cooling by the cooling means in the third embodiment. FIG. 9 is a schematic diagram of an ink jet recording apparatus according to the fourth embodiment. Component members which are identical to those in the above described third embodiment will be denoted by the same reference numerals with no duplicate description.

The fourth embodiment is characterized in that the so-called Peltier element is used on the metal plate 57a in the third embodiment for more positive cooling of the recording sheet and heating of blown air. Though the fin portion is formed integrally with the metal plate 57a in the third embodiment, the ink jet recording apparatus according to the fourth embodiment has a configuration in which a metal plate 57a1 which is in contact with the recording sheet S is separate from a metal heat dissipating fin 57a2, and a Peltier element 57d is sandwiched between the metal plate 57a1 and the metal heat dissipating fin 57a2.

In the configuration described above, the metal plate 57a1 is cooled and the heat dissipating fin 57a2 is heated when an electric current is supplied to the Peltier element 57d. The fourth embodiment is capable of leading air heated at a higher temperature to the drying means 55 while cooling the recording sheet at a temperature lower than that in the third embodiment by blowing air from the air blow fan 57b to the heat dissipating fin 57a2.

Such a configuration can provide the same effect as in the third embodiment, and furthermore it can be expected that a heater output of the drying means 55 and power consumption are reduced by introducing further heated air to the drying means 55.

(Fifth Embodiment)

Description will be made of a fifth embodiment which is capable of effectively heating by the drying means, thereby more speedily drying the recording sheet and fixing the laminating film.

Figure 10:
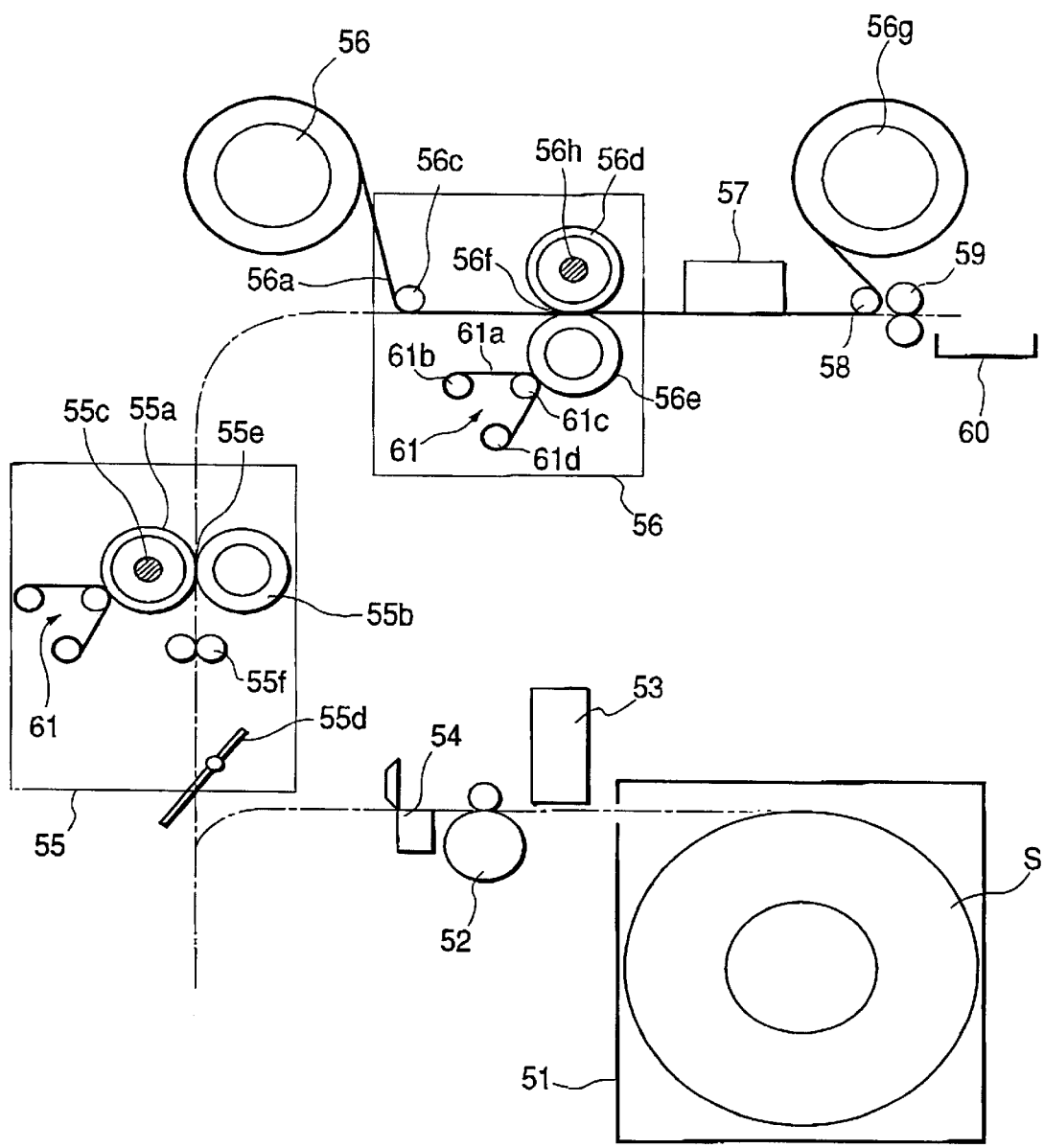
FIG. 10 is a schematic diagram of an ink jet recording apparatus according to a fifth embodiment.
Figure 11:
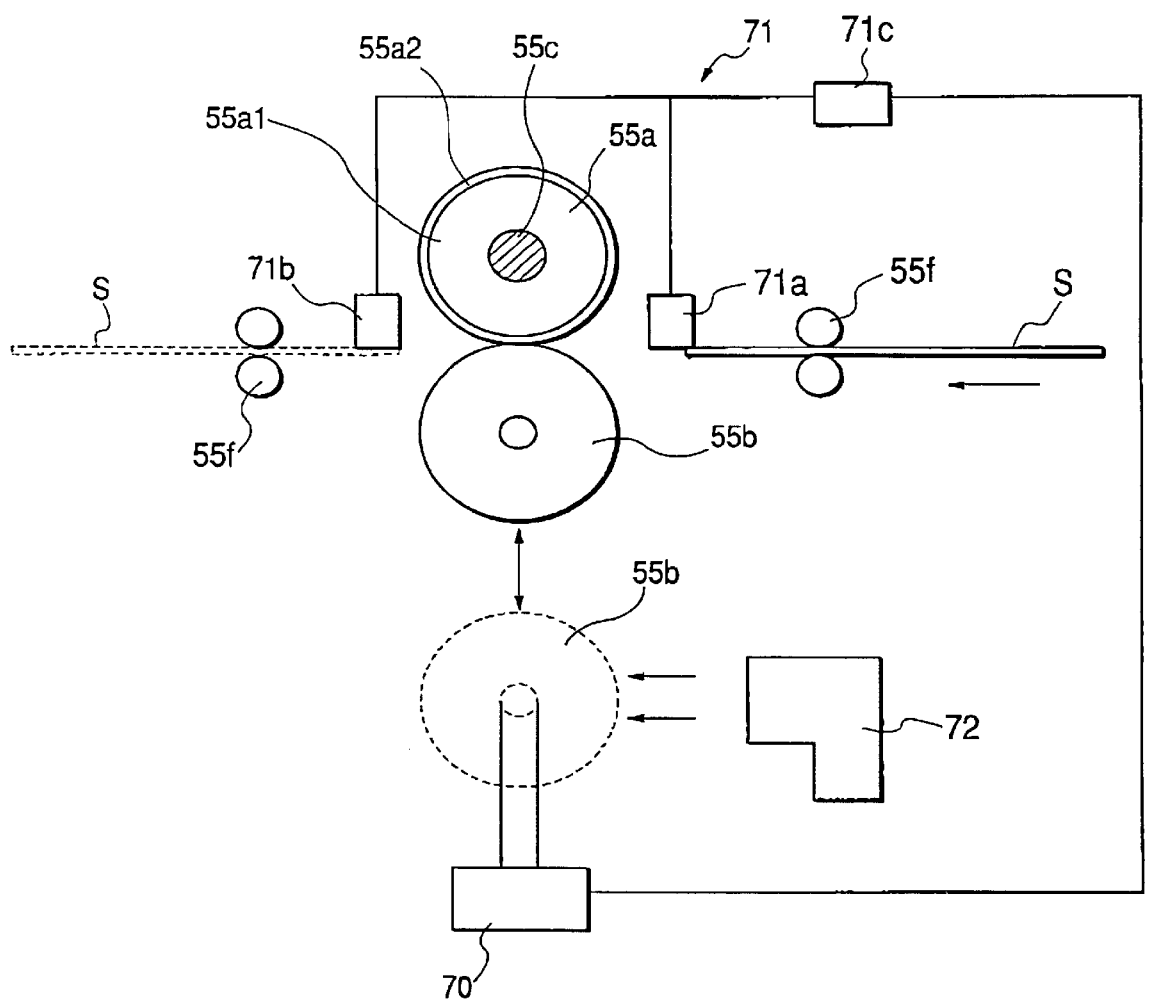
FIG. 11 is a diagram descriptive of drying means.

FIG. 10 is a schematic diagram of an ink jet recording apparatus according to the fifth embodiment and FIG. 11 is a diagram descriptive of the drying means. Also in the fifth embodiment, component members which are identical to those in the third embodiment will be denoted by the same reference numerals with no duplicate description.

In the fifth embodiment, the air blow tunnel that supplies heated air from the cooling means 57 to the drying means 55 which is used in the third embodiment is not disposed as shown in FIG. 10. Furthermore, the heating roller 55a and the pressurizing roller 55b of the drying means 55 are configured to be brought into contact with each other and also separated from each other as shown in FIG. 7.

In FIG. 11, reference numeral 70 denotes a nip releasing means for bringing the heating roller 55a and the pressurizing roller 55b into contact with each other and separating these rollers from each other, reference numeral 71 denotes sheet detecting means which has sensors 71a, 71b and a detector 71c for detecting the recording sheet S, and reference numeral 72 denotes a cooling fan.

The pressurizing roller 55b is pressed to the heating roller 55a when the recording sheet is to be heated by a pressurizing mechanism and a nip is released by nip releasing means 70 when the recording sheet is not present.

When a printer power source is turned ON, the heating roller 55a is set in an idling condition and heated to a definite temperature. When the recording sheet S on which an image is recorded by the recording means 53 is conveyed and reaches the drying means 55, the first recording sheet sensor 71a reacts and detects a leading end of the recording sheet. The nip releasing means 70 receives a signal indicating reach of the leading end of the recording sheet from the recording sheet detector 71c and starts driving to set the heating roller 55a and the pressurizing roller 55b in a nipped condition. At this time, the nip releasing means 70 is driving at a speed matched with a recording sheet conveying speed so that a shift to the nipped condition is completed immediately before the recording sheet S reaches the nip 55e in order to prevent the pressurizing roller 55b from being heated.

Furthermore, a surface temperature of the heating roller 55a is controlled in accordance with an ink discharge rate per recording sheet from nozzles of an ink jet recording head so that a surface of the recording sheet is appropriately dried and heat is not applied in an excessive amount.

When the recording sheet S has passed through the drying nip 55e and dried and the second recording sheet sensor 71b detects a tailing end of the recording sheet, the nip releasing means 70 starts releasing the nip. At this time, the nip releasing means 70 is controlled so as to start releasing after the recording sheet S has completely passed through the nip 55e. The moment that the nip releasing means 70 operates and the pressuring roller 55b comes down, the cooling fan 72 operates to cool the pressurizing roller 55b which is heated from the heating roller 55a by way of the recording sheet S.

The heating roller 55a is brought into direct contact with a surface of the recording sheet on which the image is recorded as described above, thereby abruptly heating the recording sheet and vaporizing moisture from the surface. In order to prevent the pressurizing roller 55b which is brought into contact with a rear surface of the recording sheet, the nip is released and the pressurizing roller 55b is cooled when not dried. The ink jet recording apparatus according to the fifth embodiment which has the above described configuration is capable of restricting moisture vaporization from inside the recording sheet and suppressing production of water steam while allowing only the surface of the recording sheet to be dried.

(Sixth Embodiment)

Though the heating member of the drying means and the pressurizing member of the drying means are apart from each other for a time other than a recording sheet drying time in the above described fifth embodiment, the recording sheet is dried efficiently by appropriately driving a heater in a sixth embodiment.

FIG. 12 is a diagram descriptive of drying means in the sixth embodiment. The sixth embodiment is different only in the drying means from the fifth embodiment and component members which are identical to those in the above described embodiments will be denoted by the same reference numerals with no duplicate description.

In the sixth embodiments a planar plate 75 is heated by a heater 76 which is attached to a rear side of the planar plate 75 made of a ceramic which is used in place of the heating roller 55a in the third embodiment and the recording sheet is heated by the planar plate 75 by way of a polyimide film 77.

Since the heating roller 55a used in the fifth embodiment heats the cylindrical shaft 55a1 made of aluminum and the outside silicone rubber layer 55a2 with a heater and brings this rubber layer 55a2 into contact with the recording sheet for heating, the heating roller 55a may allow a time lag to be produced between a temperature change of the heat and a temperature change of the roller surface as shown in FIG. 11. In contrast, the planar plate heater used in the sixth embodiment has the heater 76 which is attached directly to the planar plate 75 made of the ceramic, thereby allowing no long time lag between a temperature change of the heater 76 and a surface temperature of the planar plate 75.

Accordingly, the sixth embodiment is configured not to release the nip unlike the fifth embodiment, but to detect the leading end of the recording sheet S with the first recording sheet sensor 71a, heat the recording sheet by operating the heater 76 only when a leading end detection signal is provided and stop driving of the heater 76 after the recording sheet S has passed. Though the pressurizing roller 55b is heated to a certain degree by way of the recording sheet even in this case, the pressurizing roller 55b is cooled with pressurizing member cooling means such as a cooling fan 72 which is disposed on the rear side of the pressurizing roller.

Such a configuration is expectable to provide an effect similar to that of the fifth embodiment. Furthermore, the sixth embodiment permits omitting the nip releasing mechanism used in the fifth embodiment and is expectable to provide an effect to simplify a configuration.

Though the ink jet recording system is used as the recording means in the above described embodiment, another recording system such as an electrophtographic system may be used as the recording means.

Since the sixth embodiment uses the heating-pressurizing releasing means for cancelling the heating-pressurizing by the heating-pressurizing means as described above, the sixth embodiment is capable of providing a laminating apparatus which shortens a time required for recording and prepares a laminated high quality recording.

Furthermore, the sixth embodiment dries the sheet and remove moisture by the drying means before the laminating treatment and forcibly cool the sheet by the cooling means after the laminating treatment, thereby being capable of performing high quality laminating treatment in a short time.

Furthermore, the sixth embodiment is capable of performing the laminating treatment with a higher efficiency when the laminating apparatus is configured to conduct heat from the above described cooling means to the above described drying means.

In addition, when the laminating apparatus is configured so as to allow the heater to generate heat when the sheet is conveyed to the drying means, the apparatus is capable of heating the sheet with no waste or efficiently and performing the high quality laminating treatment without forcible cooling of the sheet after the laminating treatment.

What is claimed is:

1. A laminating apparatus for performing a laminating treatment of a sheet, comprising:

recording means for recording an image on the sheet by discharging ink;

drying means disposed downstream from said recording means in a sheet conveying direction, for heating and drying the sheet;

laminating means disposed downstream from said drying means in the sheet conveying direction, for laminating the sheet;

sheet cooling means disposed downstream from said laminating means in the sheet conveying direction, for cooling the sheet; and heat conducting means for conducting heat produced by said sheet cooling means to said drying means.

2. A laminating apparatus according to claim 1, wherein said drying means comprises a heating member for heating the sheet with heat generated by a heater and a pressing member for pressing the sheet onto said heating member.

3. A laminating apparatus according to claim 2, wherein said laminating means comprises a laminating film conveying means for conveying a laminating film, and heating-pressurizing means for overlapping said sheet with said laminating film, and heating and pressurizing said sheet and said laminating film.

4. A laminating apparatus according to claim 1, wherein said sheet cooling means comprises an air-blowing fan.

5. A laminating apparatus according to claim 4, wherein said sheet cooling means further comprises a metal plate cooled by blowing air from said air-blowing fan.

6. A laminating apparatus according to claim 5, wherein said sheet is brought into contact with said metal plate.

7. A laminating apparatus according to claim 4, wherein said heat conducting means comprises an air blow tunnel, and blowing air from said air-blowing fan is sent to said drying means through said air blow tunnel.

8. A laminating apparatus for performing a laminating treatment of a sheet, comprising:

recording means for recording an image on the sheet by discharging ink;

drying means disposed downstream from said recording means in a sheet conveying direction, for heating and drying the sheet;

laminating means disposed downstream from said drying means in the sheet conveying direction, for laminating the sheet; and sheet cooling means disposed downstream from said laminating means in the sheet conveying direction, for cooling the sheet.

* * * * *

UNITED STATES PATENT AND TRADEMARK OFFICE
CERTIFICATE OF CORRECTION

PATENT NO. : 6,663,238 B2
DATED : December 16, 2003
INVENTOR(S) : Tetsuo Kikuchi et al.

It is certified that error appears in the above-identified patent and that said Letters Patent is hereby corrected as shown below:

Column 1,
Line 36, "kinds" should read -- variety --.
Line 44, "flurring" should read -- blurring --.

Column 4,
Line 5, "from" should read -- from --.
Line 45, "As" should read -- An --.

Column 9,
Line 25, "$C=C_1 \rightarrow C=0 \rightarrow C=-C_2C=0$" should read -- $C=C_1 \rightarrow C=0 \rightarrow C=-C_2 \rightarrow C=0$ --.
Line 35, "a rewinding" should read -- of a rewinding --

Column 10,
Line 7, "transparent film layer forming member" should read -- transparent film layer forming member 5 --.
Line 43, "dependently" should read -- dependent --.
Line 59, "Tough" should read -- Though --.

Column 14,
Line 3, "bent" should read -- bend --.

Column 17,
Line 24, "embodiments" should read -- embodiment, --.
Lines 51 and 54, "expectable" should read -- expected --.
Line 58, "electrophtographic" should read -- electrophotographic --.

Signed and Sealed this

Sixth Day of July, 2004

JON W. DUDAS
*Acting Director of the United States Patent and Trademark Office*